July 31, 1956  C. T. BUTTON ET AL  2,756,953
MOTOR MOUNTING BRACKET
Filed May 13, 1953
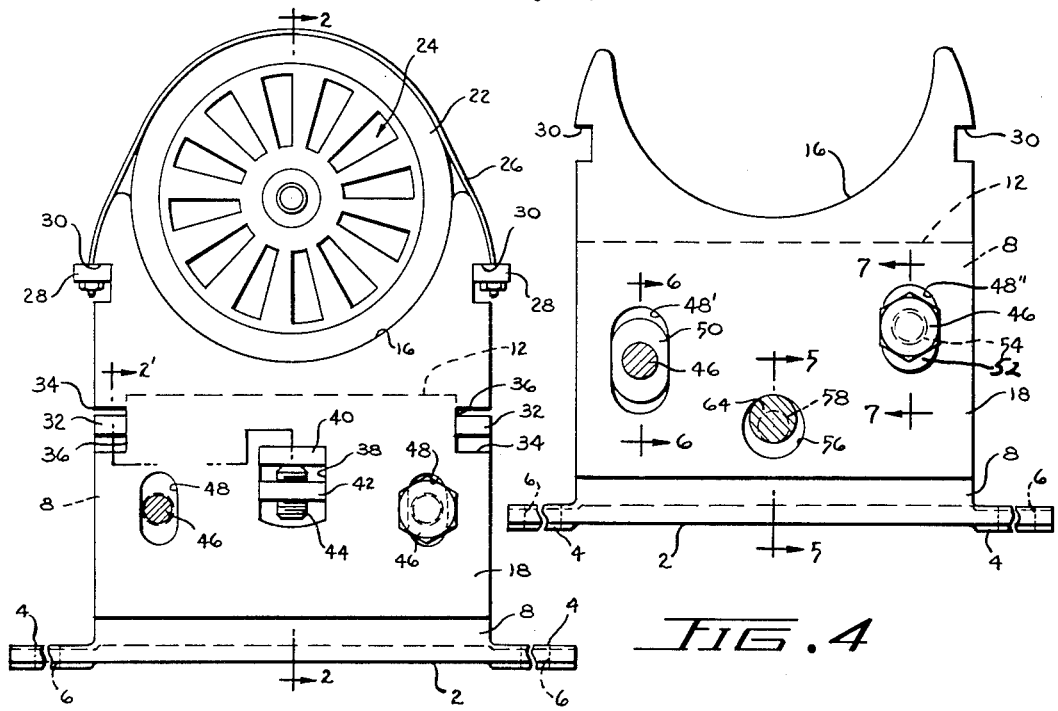
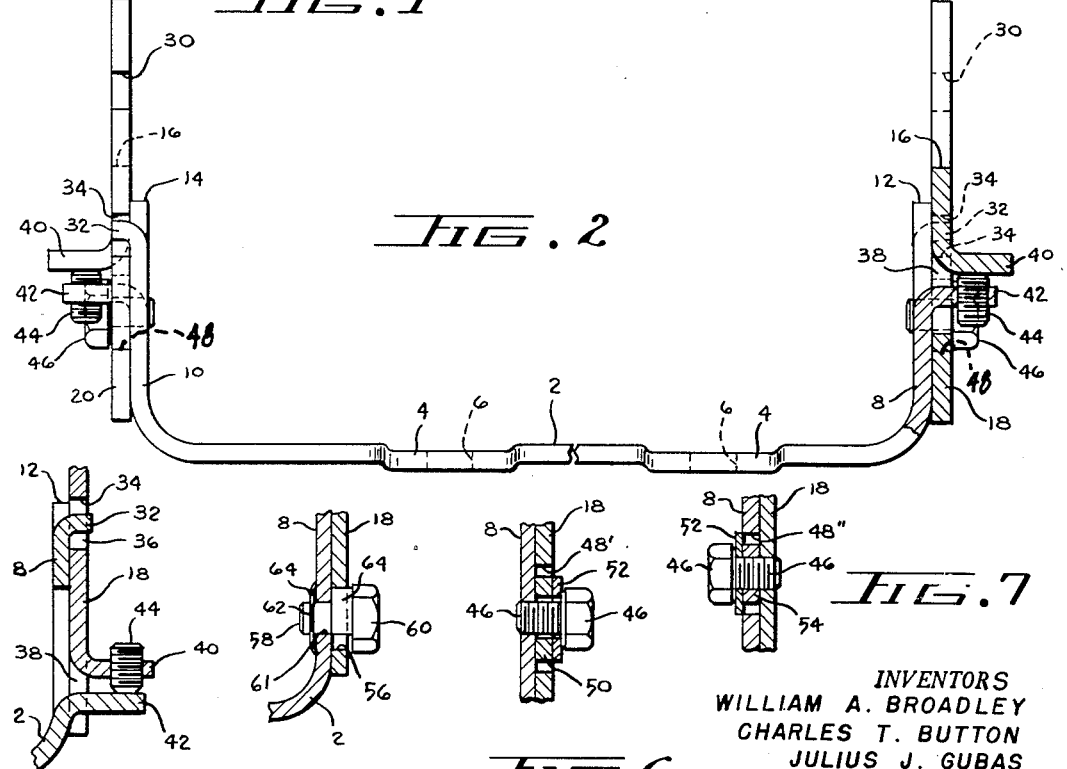
INVENTORS
WILLIAM A. BROADLEY
CHARLES T. BUTTON
JULIUS J. GUBAS
BY James and Franklin
ATTORNEY

United States Patent Office 2,756,953
Patented July 31, 1956

2,756,953

MOTOR MOUNTING BRACKET

Charles T. Button, Needham, William A. Broadley, East Walpole, and Julius J. Gubas, Westwood, Mass., assignors to National Pneumatic Co., Inc., Boston, Mass., a corporation of Delaware Application May 13, 1953, Serial No. 354,822

10 Claims. (Cl. 248—16)

The present invention relates to a bracket for mounting a motor or the like and which facilitates the accurate positioning and alignment of such a motor.

In many installations electric motors and the like must be mounted with great accuracy. For example, where the motor is mounted relative to a blower housing and the blower wheel is secured directly to the motor shaft, it is essential that the motor be so positioned and aligned that the blower wheel can be rotated within the blower housing without interference and with a precise clearance dictated by appropriate engineering considerations. In some units manufactured by the assignee of the instant invention, the motor shaft extends out beyond the motor for a distance of well over two feet. It will be appreciated that even a slight angular misalignment of such a mounted motor will result in an appreciable linear displacement of the shaft tip from its proper position.

Many factors control the precise positioning of a motor. The motor housings themselves are generally provided with bearing hubs adapted to be received on a mounting bracket. Any departure of the external dimensions of these hubs from required values or exact concentricity will cause misalignment or faulty positioning of the motor no matter how accurately the base or mounting bracket may be formed. Variations in the size, relative location and concentricity of the portions of the mounting bracket into which the bearing hubs are adapted to be received will have similar effects. To hold the dimensions and relative positions of the interengaging bearing hubs and mounting bracket surfaces within tolerances sufficiently close to eliminate excessive misalignment or mispositioning of the motor is, of course, possible, but only at great cost both insofar as the requisite machining operations are concerned and also taking into account the necessarily high number of rejects which would be involved.

Furthermore, it is often desired to interpose a rubber ring or pad between the motor bearing hub and the motor-receiving surface on the mounting bracket in order to insulate the mounting surface from motor vibration and thus promote quiet operation. Since these rubber rings cannot be manufactured to the same fine tolerances as are possible in the machining of hard metals, the use of such rings or similar shock-absorbing pads in the mounting of motors necessitates that precise alignment of those motors to be obtained by process of trial and error at the time and site of assembly of the composite unit, no matter how accurately the mounting bracket and the motor bearing hubs may be machined. Mounting rings or pads must be tried and discarded until a pair of rings or pads have been selected which, when used with a particular bearing bracket and a particular motor housing, produce proper alignment of the motor shaft. This is obviously a time consuming task which greatly reduces rate of production of the overall installation and hence materially increases costs. In addition, replacement of one rubber mounting ring or pad with another is not a matter of merely interchanging standard parts, but also involves careful selection of the particular mounting ring to be used.

The present invention has for its prime object the provision of a motor mounting bracket which need not be constructed to close tolerances, which can be used for the mounting of motors the bearing hubs of which are not machined to close tolerances either as to size or concentricity, and with which rubber mounting rings or pads may be employed, yet which will permit the positioning and alignment of the motor to whatever degree of precision and accuracy is dictated by the particular installation. To that end, the mounting bracket has a part adapted to be secured to a supporting surface, additional parts being adjustably movably mounted on the first part in such a way that their alignment is closely controlled, these additional parts having surfaces adapted to receive the motor bearing hubs, with or without resilient rings or pads interposed therebetween. The individual adjustment of the position of these individual parts relative to the first part permits the alignment and positioning of the motor to be accurately determined and controlled. The various bracket parts may be formed from castings or from sheet stock, using quantity production procedures. As a result the mounting brackets may be manufactured quite inexpensively. The relatively movable bracket parts are interconnected by means of simple structure which nevertheless permits and facilitates adjustment of the position of the parts with respect to one another, that adjustment being readily achieved after the motor has been mounted on the bracket and the bracket mounted on an appropriate supporting surface. Consequently a standard bracket assembly can be used in a wide variety of installations, the bracket permitting the motor to be precisely positioned and aligned without regard to differences in the individual installations, differences in the individual motors, differences in the individual mounting brackets, and differences in the mounting rings or pads, if employed.

To the accomplishment of the above, and to such other objects as may hereinafter appear, the present invention relates to the structure of a motor mounting bracket as defined in the appended claims and as described in this specification, taken together with the accompanying drawings, in which:

Fig. 1 is an end elevational view of one embodiment of the present invention with a motor mounted thereon;

Fig. 2 is a side elevational view of the mounting bracket of Fig. 1, the right hand end thereof being cross sectioned substantially along the line 2—2 of Fig. 1;

Fig. 3 is a fragmentary cross sectional view taken along a line corresponding to the line 2—2' of Fig. 1, but of a different embodiment;

Fig. 4 is an end elevational view of yet another embodiment of the mounting bracket;

Fig. 5 is a fragmentary cross sectional view taken along the line 5—5 of Fig. 4;

Fig. 6 is a fragmentary cross sectional view taken along the line 6—6 of Fig. 4; and Fig. 7 is a fragmentary cross sectional view taken along the line 7—7 of Fig. 4.

The mounting bracket of the present invention comprises a base 2 having feet 4 provided with apertures 6 through which screws, bolts or the like may be passed to secure the base to any appropriate supporting surface. Extending upwardly from the base 2 substantially at opposite ends thereof are plates 8 and 10. The upper edges 12 and 14 of the plates 8 and 10 respectively are positioned below the motor receiving surfaces 16, here shown as arc-shaped, on plates 18 and 20 mounted respectively on the outer surfaces of the plates 8 and 10 and vertically slidable with respect thereto. The bearing hubs 22 of an electric motor such as the one generally designated 24 in Fig. 1 are adapted to rest on the surfaces 16, with or without resilient rubber rings or pads (not shown) interposed therebetween, the motor being held in position on the surfaces 16 in any suitable manner, as by means of straps 26 having blocks 28 on the ends thereof adapted to be received in notches 30 formed in the side edges of the plates 18 and 20.

In the embodiments of Figs. 1–3 the plates 8 and 10 are provided with outwardly projecting fingers 32 laterally spaced from one another and here shown as each positioned on the opposite side of a vertical centerline through the plate 8 or 10 from the other, those fingers extending through slots 34 formed in the outer plates 18, the fingers 32 engaging side surfaces 36 of the slots 34, which side surfaces are parallel to the vertical centerline through the plate 18. The slots 34 are vertically elongated, and consequently the outer plates 18 and 20 are permitted a limited but appreciable degree of vertical movement relative to their corresponding inner plates 8 and 10, the engagement between the fingers 32 and the side slot surfaces 36 retaining each outer plate 18 or 20 in accurate vertical alignment with its respective inner plate 8 or 10.

In the embodiment of Figs. 1 and 2 each of the outer plates 18 and 20 has a centrally positioned vertically elongated aperture 38 formed therein, and an outwardly extending finger 40 is provided on the plates 18 and 20 above the aperture 38. As shown, the finger 40 may be integral with the plates 18 and 20 and punched out therefrom so as to form the aperture 38. The inner plates 8 and 10 have members 42 projecting outwardly therefrom in registration with and passing through the apertures 38 so as to underlie the fingers 40. As here shown, the width of the projecting members 42 is closely the same as the width of the apertures 38, the sides of the members 42 thus engaging the vertical side surfaces of the apertures 38 so as to further facilitate proper vertical alignment of each pair of outer and inner plates as they move relative to one another.

An element of adjustable effective height, shown in Figs. 1 and 2 as a screw 44, is threadedly received in that portion of the member 42 which extends out beyond the outer plate 18 or 20, the tip of the screw 44 engaging the corresponding finger 40. It will be apparent that rotation of each screw 44 will cause the finger 40 to approach or to separate from the corresponding member 42, and thus will cause the corresponding outer plate 18 or 20 to slide up or permit it to move down over its corresponding inner plate 8 or 10. Of course, if desired, the position of the screw 44 could be reversed, the screw 44 being threadedly received in the finger 40 and engaging the member 42. This modification is illustrated in Fig. 3.

Means are provided for retaining the outer plates 18 and 20 against the outer surfaces of their respective inner plates 8 and 10 and for reliably clamping them in position once the plates of each pair have been properly relatively positioned. This retaining and fastening effect is produced by a pair of headed screws 46 the tips of which are threadedly received in the inner plates 8 and 10 and the bodies of which extend through elongated slots 48 formed in the outer plates 18 and 20. When the screws 46 are loosened the outer plates 18 and 20 may be vertically adjusted relative to their respective inner plates 8 and 10 through rotation of the appropriate screws 44. The screws 46 are then tightened to fix and retain the adjusted relative position of the plates.

In the embodiment of Fig. 4 the fingers 32 and slots 34 are dispensed with, vertical alignment of the outer plate 18 with respect to the inner plate 8 being achieved by utilizing the slots 48′ and 48″ through which the screws 46 pass, those slots corresponding to the slots 48 of Fig. 1 except that they are made somewhat wider. In slot 48 a key 50 is mounted through which the screw 46 snugly passes, the key 50 having a width closely approximating that of the slot 48′. If desired, a washer 52, which may be of substantially the same shape as the key 50, may be interposed between the head of the screw 46 and the key 50, the width of the washer 52 preferably being somewhat wider than the width of the slot 48′ so that when the screw 46 is tightened the outer plate 18 will be clamped in place by the head of the screw 46.

The slot 48″, laterally spaced from the slot 48′ and preferably positioned on the opposite side of the vertical centerline through the plate 18 therefrom, may be of the same nature as the slot 48′. As illustrated in Fig. 4, however, a slightly different construction is employed, the slot 48″ being somewhat shorter than the slot 48′, a round guide 54 having a diameter substantially the same as the width of the slot 48′ being received therewithin, the body of the screw 46 passing snugly therethrough. Because the guide 54 is not as tall as the key 50, the slot 48″ need not be as long as the slot 48′ and yet permit the same amount of relative vertical movement between the outer plate 18 and the inner plate 8. A washer 52, slightly wider than and perhaps even slightly longer than the slot 48″, may be interposed between the head of the screw 46 and the guide 54. The key 50 and guide 54 are laterally immovable, being held in position by the screws 46, and by reason of their respective engagement with the side surfaces of the slots 48′ and 48″ they ensure that the outer plates 18 and 20 will remain in proper vertical alignment with their respective inner plates 8 and 10 no matter what the relative vertical positions of each pair of plates may be.

Fig. 4 also discloses a different type of element of adjustable effective height. The outer plate 18 is provided with an aperture 56 through which a pin 58 having a head 60 passes, the tip of the pin 58 passing through an aperture 61 in the inner plate 8 and having a groove 62 within which a resilient retaining ring 64 is received. Mounted on that part of the pin 58 which passes through the aperture 56 in the outer plate 18 is an eccentric 64. Rotation of the pin 58 by means of its head 60 will cause the eccentric 64 to rotate and consequently it will lift the outer plate 18 with respect to the inner plate 8 or permit it to fall.

The parts of the mounting bracket of the present invention may be simply, inexpensively and rapidly made. The parts may be assembled even by unskilled operators. No special precision is required as to any of the parts thereof. In use, the base 2 will be bolted or otherwise secured to the appropriate supporting surface, the motor 24 will be mounted on the surfaces 16 of the outer plates 18 and 20 and clamped in position, as by the use of the strap 26, the screws 46 will be loosened, and the relative positions of the outer plates 18 and 20 relative to their corresponding inner plates 8 and 10 will then be individually adjusted, as by rotating the screws 44 in the embodiments of Figs. 1–3 or by turning the pin head 60 in the embodiment of Figs. 4–7, thus raising or lowering each end of the motor 24 individually until the motor 24 is at its proper height and is accurately aligned with all other parts of the installation. Then the screws 46 are tightened, and the motor is ready to run. The individual adjustment of the outer plates 18 and 20 will compensate for all irregularities and departures from designed dimensions and relative positions, within wide limits, of the mounting bracket parts, the motor mounting hubs 22, and the rubber mounting rings or pads, if used. If any part of the installation is replaced, variations in dimension or location of the new part with respect to the old part may be compensated for merely by readjusting the position of one or both of the outer plates 18 and 20 relative to their respective inner plates 8 and 10.

While but a limited number of embodiments of the present invention have been here specifically disclosed, showing alternative modes of controlling the relative vertical positions of each outer plate with respect to its inner plate and ensuring accurate vertical alignment of said plates, it will be apparent that many variations may be made in the specific design thereof without departing from the spirit of the invention as defined in the following claims.

We claim:

1. A motor mounting bracket comprising a base with two spaced upstanding end plates, two extension plates, each slidable along one of said end plates, projecting up therefrom and defining therewith a cooperating pair of plates, the upper surfaces of said extension plates being concave so as to receive and support a portion of a motor housing, fastening elements operatively connected to the plates of each pair and movable between a position clamping said pair of plates against one another and a position releasing said plates for relative vertical movement, an aperture in one plate of each pair of plates, a member projecting from the other plate of each pair of plates through said aperture, and an element of adjustable effective height operatively connected to said member and to said one plate of each pair of plates so as to vary the relative vertical positions of the plates of each of said pairs.

2. The motor mounting bracket of claim 1, in which one plate of a pair of plates has a pair of laterally spaced elongated vertical slots, the other plate of said pair of plates having fingers rigidly fixed thereto, projecting into said slots and engaging side surfaces thereof, thereby ensuring accurate vertical alignment of said extension plate relative to its respective end plate.

3. The motor mounting bracket of claim 1, in which said one plate of a pair of plates has a portion projecting outwardly in vertical alignment with said aperture, the projecting member from the other plate of said pair of plates extending out in vertical alignment with said portion, said element of adjustable effective height comprising a screw threadedly engaged with one of said portion and said member and engageable with the other.

4. The motor mounting bracket of claim 1, in which said element of adjustable effective height comprises an eccentric mounted on the member projecting from said other plate of said pair of plates and rotatable within the aperture in said one plate of said pair of plates.

5. The motor mounting bracket of claim 1, in which one plate of a pair of said plates has a pair of laterally spaced elongated vertical slots, the other plate of said pair of plates having fingers rigidly fixed thereto, projecting into said slots and engaging side surfaces thereof, thereby ensuring accurate vertical alignment of said extension plate relative to its respective end plate, and in which said one plate of a pair of plates has a portion projecting outwardly in vertical alignment with said aperture, the projecting member from said other plate of said pair of plates extending out in vertical alignment with said portion, said element of adjustable effective height comprising a screw threadedly engaged with one of said portion and said member and engageable with the other.

6. A motor mounting bracket comprising a base with two spaced upstanding end plates, two extension plates, each slidable along the exterior of one of said end plates, projecting up therefrom and defining therewith a cooperating pair of plates, the upper surfaces of said extension plates being concave so as to receive and support a portion of a motor housing, one plate of each pair of plates having a pair of elongated vertical slots, each of said slots being on the opposite side of a vertical centerline through said plates from the other, fastening elements passing through said slots and engaged with the other plate of each pair of plates, said fastening elements being movable between a position clamping said pair of plates against one another and a position releasing said plates for relative vertical movement, an aperture in said one plate of each pair of plates substantially on the vertical centerline thereof, a member projecting from said other plate of each pair of plates through said aperture, and an element of adjustable effective height operatively connected to said member and to said one plate of each pair of plates so as to vary the relative vertical positions of the plates of each of said pairs.

7. The motor mounting bracket of claim 6, in which said one plate of one pair of plates has an additional pair of elongated vertical slots, each of said slots being on the opposite side of a vertical centerline through said plate from the other slot, said other plate of said pair of plates having fingers rigidly fixed thereto, projecting into said slots and snugly engaging side surfaces thereof, thereby ensuring accurate vertical alignment of said one plate relative to its respective other plate.

8. The motor mounting bracket of claim 6, in which said one plate of a pair of plates has a portion projecting outwardly in vertical alignment with said aperture, the projecting member from said other plate of said pair of plates extending out in vertical alignment with said portion, said element of adjustable effective height comprising a screw threadedly engaged with one of said portion and said member and engageable with the other.

9. The motor mounting bracket of claim 6, in which said element of adjustable effective height comprises an eccentric mounted on the member projecting from said other plate of said pair of plates and rotatable within the aperture in said one plate of said pair of plates.

10. The motor mounting bracket of claim 6, in which said one plate of a pair of plates has an additional pair of elongated vertical slots, each of said slots being on the opposite side of a vertical centerline through said plate from the other slot, said other plate of said pair of plates having fingers rigidly fixed thereto, projecting into said slots and engaging side surfaces thereof, thereby ensuring accurate vertical alignment of said one plate relative to its respective other plate, and in which the one plate of said pair of plates has a portion projecting outwardly in vertical alignment with said aperture, the projecting member from the other plate of said pair of plates extending out in vertical alignment with said portion, said element of adjustable effective height comprising a screw threadedly engaged with one of said portion and said member and engageable with the other.

References Cited in the file of this patent

UNITED STATES PATENTS

| | | |
|---|---|---|
| 1,453,416 | Stanley | May 1, 1923 |
| 1,688,897 | Spreen | Oct. 23, 1928 |
| 2,002,538 | Kindelmann et al. | May 28, 1935 |
| 2,171,441 | Barry | Aug. 29, 1939 |
| 2,185,375 | Janca | Jan. 2, 1940 |
| 2,565,473 | Cline | Aug. 28, 1951 |
| 2,606,453 | Firth | Aug. 12, 1952 |

FOREIGN PATENTS

| | | |
|---|---|---|
| 334,250 | Great Britain | Sept. 1, 1930 |